Jan. 30, 1940.   W. J. CHIEVITZ   2,188,857
OIL SEAL
Filed Dec. 27, 1937
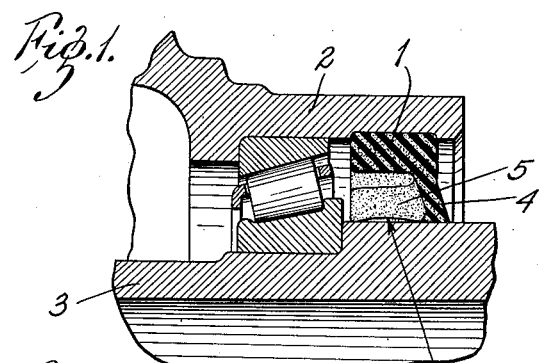
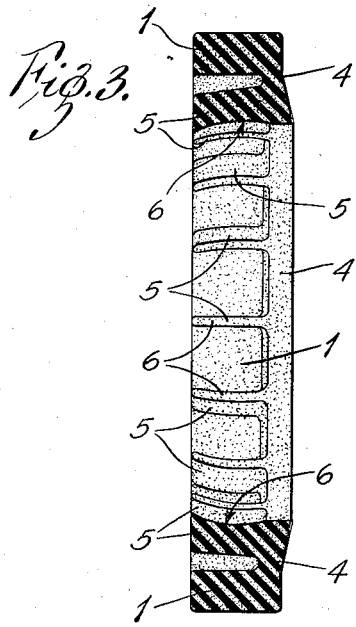
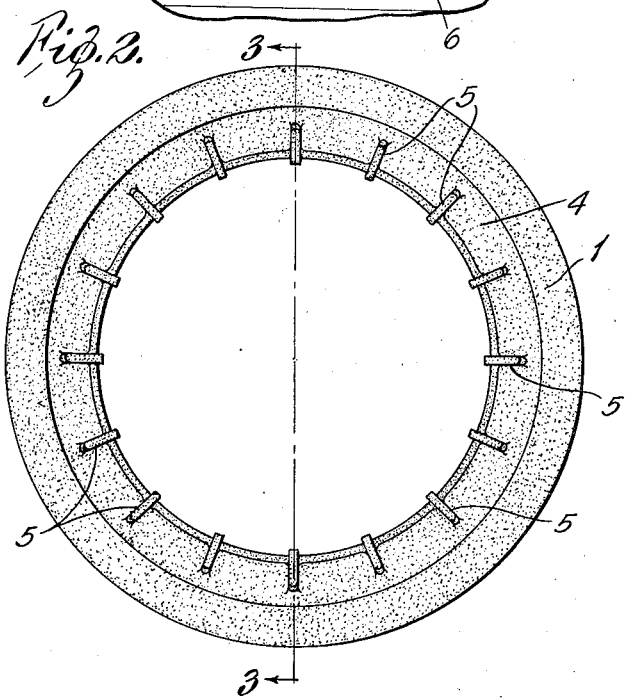
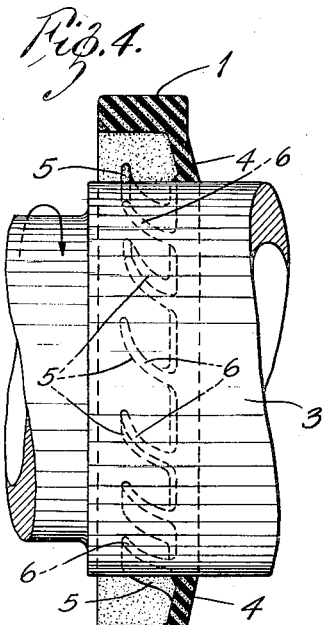
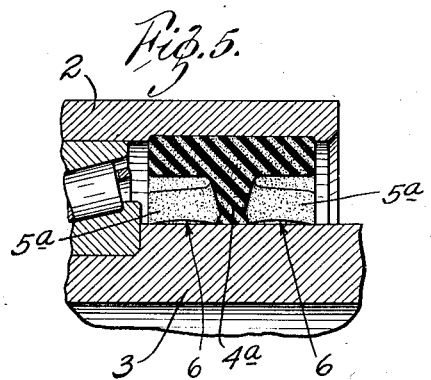
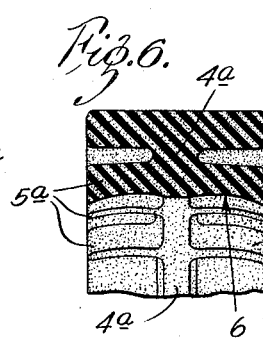

Patented Jan. 30, 1940

2,188,857

UNITED STATES PATENT OFFICE 2,188,857

OIL SEAL

William J. Chievitz, Canton, Ohio, assignor to The Timken Roller Bearing Company, Canton, Ohio, a corporation of Ohio Application December 27, 1937, Serial No. 181,828

6 Claims. (Cl. 288—19)

My invention relates to that type of ring like devices that are interposed between a shaft and its housing for the purpose of preventing leakage of oil or the entry of dirt. The principal object of the invention is to adapt the device to wipe the shaft in such manner as to move the oil or dirt back in the direction from which it came. The invention consists principally in providing the ring with flexible fingers preferably integral with the ring and extending longitudinally thereof in position to wipe the shaft. It also consists in the arrangement and combinations of parts hereinafter described and claimed.

In the accompanying drawing, which forms part of this specification and wherein like reference numerals refer to like parts wherever they occur.

Fig. 1 is a longitudinal sectional view of a sealing ring embodying my invention shown interposed between a relatively rotatable shaft and housing before the fingers of the ring are twisted askew, Fig. 2 is an end view of the sealing ring, Fig. 3 is a central longitudinal section through the sealing ring, Fig. 4 is a view of the shaft with the sealing ring thereon, showing the positions taken by the fingers of said ring when the shaft is rotated in the direction indicated by the arrow; and Figs. 5 and 6 are views similar to Figs. 1 and 3, respectively, illustrating a sealing ring of modified form.

My device comprises a relatively wide ring 1 of elastic material, such as Thiokol or other synthetic rubber that is substantially resistant to lubricating oil. The peripheral portion of this ring is adapted to be seated with a tight fit in a shallow groove provided therefor in the housing 2 of a shaft 3. By reason of the elasticity of the ring, it can be compressed sufficiently to reach such groove and, when in register therewith, the ring will expand into frictional engagement with the bottom of the groove.

The ring is provided, preferably at one end, with an inwardly extending annular flange 4 which is integral therewith and whose inside diameter is the same or, preferably, slightly less than the diameter of the shaft which extends therethrough and has a sliding fit therein.

On one side face of the flange are a series of thin lugs or fingers 5 that normally lie in planes passing through the axis of the ring. These fingers are integral with the flange but are otherwise clear of the ring and are long enough and thin enough to be quite flexible. At their free ends, the inner edges 6 of the fingers are closer to the axis of the ring than the inside diameter of the flange 4 thereon so that the inner edges of the fingers will bear against the shaft when the device is mounted thereon. The inner edges of the fingers are concaved endwise so that, when the fingers are flexed askew of the shaft, the concaved portion of the edge will contact with the surface of the shaft.

The operation of my device is as follows. By reason of its frictional grip, the ring remains stationary in the groove of the housing; but the flange fits the shaft lightly enough to permit rotation of the shaft therein. On account of the free ends of the fingers making contact with the shaft, there is sufficient friction between them for the shaft to twist said fingers askew with reference to the shaft, that is, into a position (see Fig. 4) wherein the ends of the fingers are circumferentially rearward of the bases of the fingers. In this twisted position, the concavity in the inner edge of a finger, together with the resiliency of the material, enable the finger to hug the shaft substantially throughout the length of the finger along a helical line of contact. In this position, the fingers not only wipe the moving shaft but on account of their inclination to the axis of the shaft, they serve as deflectors to move oil or dirt toward the ends of the fingers and away from the flange, that is, back in the direction from which it came. Likewise, it is noted that the fingers are equally efficient whether the shaft is rotating in one direction or the opposite.

The device hereinbefore described is provided with fingers on only one side face of the flange. When that device is used to prevent the escape of oil from the inside of the housing, the device is set with the fingers extending to the inside of the housing. When it is desired to keep dirt from entering the housing, the device is set with the fingers extending away from the housing. In the latter case, the fingers work as in the first case; but the skew or inclination of the fingers with reference to the shaft is in an opposite direction and therefore tends to move the particles away from the flange but in a direction opposite to that in the first case.

In the construction above described, the fingers extend from the flange substantially in planes that pass through the axis of the ring, and said fingers, being made flexible, operate equally well whether the shaft is going forwardly or backwardly. In cases where the shaft rotates in only one direction, the device may be made with the fingers set askew at the desired angle in a more or less permanent position and with their inner edges concaved to contact suitably with the shaft.

In the modification illustrated in Figs. 5 and 6, the flange 4a has one set of flexible fingers 5a on one face and another series of flexible fingers 5a on the opposite face. The operation is similar to that above described, one set of fingers repelling the oil in one direction and the other set of fingers repelling the dirt in the opposite direction.

What I claim is:

1. A sealing device comprising a ring of elastic material having an inwardly extending annular flange, said flange having axially elongated and circumferentially thin flexible fingers which are spaced apart on the inner margin of a side face thereof and are clear of the body portion of the ring.

2. A sealing device comprising a ring of elastic material having an inwardly extending annular flange, said flange having thin flexible fingers which are spaced apart on opposite sides faces thereof and have portions of their inner edges substantially in longitudinal alinement with the inner surface of the flange the length of said fingers measured axially of the ring being greater than the thickness thereof measured circumferentially and said fingers being clear of the body portion of the ring.

3. A sealing device comprising a ring of elastic material having an inwardly extending annular flange, said flange having series of elongated flexible fingers extending in substantially axial planes from the opposite side faces of the flange the length of said fingers measured axially of the ring being greater than the thickness thereof measured circumferentially and said fingers being clear of the body portion of the ring.

4. A sealing device comprising a ring of elastic material having an inwardly extending annular flange, said flange having flexible fingers which are spaced apart on a side face thereof, the ends of the inner edge of each finger being closer to the axis of said ring than the inner surface of the flange and the intermediate portion of said edge being concave endwise.

5. A sealing device comprising a ring of elastic material having an inwardly extending annular flange, said flange having flexible fingers which are spaced apart on a side face thereof and are free from the body portion of said ring, the free ends of the inner edge of each finger being as close to the axis of the ring as the inner surface of the flange is and the outer edges of the fingers being closer to said axis than the inner surface of the body of the ring is.

6. A sealing device comprising a ring of elastic material having an inwardly extending annular flange, said flange having flexible fingers which are spaced apart on a side face thereof and are free from said ring, the free ends of the inner edge of each finger being as close to the axis of the ring as the inner surface of the flange is and the intermediate portion of said edge being concave endwise.

WILLIAM J. CHIEVITZ.